United States Patent [19]

Mollison

[11] Patent Number: 4,503,102

[45] Date of Patent: Mar. 5, 1985

[54] POUCHES OF ETHYLENE-α-OLEFIN COPOLYMER/ETHYLENE-VINYL ACETATE COPOLYMER BLENDS

[75] Inventor: Alistair N. Mollison, Kingston, Canada

[73] Assignee: Du Pont of Canada, Inc., Montreal, Canada

[21] Appl. No.: 500,385

[22] Filed: Jun. 2, 1983

[30] Foreign Application Priority Data

Jun. 2, 1982 [GB] United Kingdom ....................8201601

[51] Int. Cl.$^3$ ...................... B32B 27/34; C08F 37/18; C08J 1/40
[52] U.S. Cl. ...................................... 428/35; 428/518; 525/222
[58] Field of Search .................... 525/222; 428/475.8, 428/35, 483, 518, 516

[56] References Cited

U.S. PATENT DOCUMENTS

| | | | |
|---|---|---|---|
| 3,682,767 | 8/1972 | Britton et al. | 525/222 |
| 3,817,821 | 6/1974 | Gallini | 525/222 |
| 4,126,649 | 11/1978 | Decroix | 525/222 |
| 4,189,519 | 2/1980 | Ticknor | 525/222 |
| 4,425,268 | 1/1984 | Cooper | 525/222 |

Primary Examiner—John E. Kittle

[57] ABSTRACT

Pouches containing a flowable material e.g. milk, ice cream mix, are made of a sealant film which is a blend of a linear ethylene-$C_4$–$C_{10}$ α-olefin copolymer and an ethylene-vinyl acetate copolymer. The ethylene-$C_4$–$C_{10}$ α-olefin has a density of 0.916 to 0.930 g/cm$^3$ and a melt index of from 0.3 to 2.0 dg/min. The ethylene-vinyl acetate copolymer has a weight ratio of ethylene to vinyl acetate from 2.2 to 24 and a melt index of from 0.2 to 10 dg/min. The blend has a ratio of linear ethylene-$C_4$–$C_{10}$ α-olefin copolymer to ethylene vinyl acetate copolymer of from 1.2:1 to 9:1.

10 Claims, No Drawings

POUCHES OF ETHYLENE-α-OLEFIN COPOLYMER/ETHYLENE-VINYL ACETATE COPOLYMER BLENDS

The invention relates to pouches filled with flowable materials, e.g. liquids, particularly to pouches made on so-called vertical form and fill machines.

It is well known to package flowable materials, for example, milk, on a so-called vertical form and fill machine. Using such a machine, a flat web of synthetic thermoplastic film is unwound from a roll and formed into a continuous tube, in a tube-forming section by sealing the longitudinal edges of the film together to form a so-called lap seal or a so-called fin seal. The tube thus formed is pulled vertically downwards to a filling station. The tube is then collapsed across a transverse cross-section of the tube, the position of such cross-section being at a sealing device below the filling station. A transverse heat seal is made, by the sealing device, at the collapsed portion of the tube, thus making an air-tight seal across the tube. The sealing device generally comprises a pair of jaws, and is described more fully hereinbelow. After making the transverse seal, but before the jaws of the sealing device are opened, a pre-set quantity of material to be packaged e.g. liquid is allowed to enter the tube, at the filling station, and fill the tube upwardly from the aforementioned transverse seal. The tube is then allowed to drop a predetermined distance under the influence of the weight of the material in the tube. The jaws of the sealing device are closed again, thus collapsing the tube at a second transverse section, which is above, usually just above, the air/material interface in the tube. The sealing device seals and severs the tube transversely at the second transverse section. The material-filled portion of the tube is now in the form of a pillow shaped pouch. Thus the sealing device has sealed the top of a filled pouch, sealed the bottom of the next-to-be-formed pouch and separated the filled pouch from the next-to-be-formed pouch, all in one operation.

One vertical form and fill machine of the type described above is a Prepac*IS-6 liquid packaging machine.
*denotes trade mark.

A sealing device commonly used is a so-called impulse sealer which has a sealing element mounted in sealing jaws and electrically insulated therefrom. In operation the sealing jaws are closed and an electrical current is caused to flow through a sealing element e.g. a wire, for a fraction of the time that the jaws are closed. The jaws remain closed during a cooling period in which the seals partially solidify before the sealing jaws are opened. The transverse seal thus obtained supports the weight of the flowable material e.g. liquid, in the next-to-be-formed pouch.

A sealing element made of round wire e.g. "piano" wire about 1.6 to 2.5 mm diameter, electrically insulated from a water cooled supporting jaw, may be used but a wire of rectangular cross-section is preferred. These types of sealing elements may be used for making both the longitudinal and transverse seals.

The temperature of the sealing element during passage of the electrical current is largely determined by the resistance of the sealing element, the voltage applied across the element, the heat transfer rate through the film being sealed and the temperature and mass of the jaw of the sealing device. As may be seen, operation of the impulse sealer may affect the seal strength and it is desirable to optimize such operation.

When a liquid is packaged in pouches as described above, the liquid, especially if aqueous, aids in cooling the transverse seal in the tube after the sealing jaws are opened, because of the liquid's relatively high thermal conductivity. It appears that the cooling effect of the liquid on the seal takes effect before the weight of the liquid can weaken or rupture the bottom seal.

U.S. Pat. No. 3,682,767 issued Aug. 8, 1979 to Britton et al, discloses liquid filled pouches made from films of blends of (a) 90–50 wt.% of a random copolymer of ethylene and an olefinic unsaturated monomer e.g. vinyl acetate, which is present in the amount of 2–10 wt.% of the copolymer and (b) 10–50% of a linear copolymer of ethylene and a $C_3$–$C_{20}$ α-olefin of a density of about 0.930 to 0.960 g/cm$^3$.

It is more common, commercially, to use film made from a blend containing 70–90% linear ethylene-butene copolymer having a density of about 0.919 g/cm$^3$ and a melt index of about 0.75 dg/min and 10–30% high pressure polyethylene i.e. a homopolymer, having a melt index of about 2 to 10 and a density of from 0.916 to 0.924 g/cm$^3$. Density is determined by ASTM Procedure D1505-68 and melt index by ASTM Procedure D1238-79 (Condition E). Such films having a thickness of about 76 micrometers, have been used for making pouches containing about 1.3 liters of milk. Pouches made from such film are generally satisfactory from the standpoint of pouch toughness and puncture resistance, but suffer from a tendency to have weak transverse end and/or longitudinal seals even though the operating conditions of the impulse sealer have been optimized. Defective seals may lead to the phenomenon known as "leakers", in which the flowable material e.g. milk, may escape from the pouch through pinholes which develop at or close to the seal. It has been estimated that leakers account for about 1–2% of the 1.3 liter milk pouch production.

It has been proposed that increasing the film thickness would overcome the problem of leakers. However, it has been shown that even at film thicknesses of up to about 127 micrometers the percentage of leakers is not substantially reduced and yet the cost of the unfilled pouch is increased in proportion to the increase in thickness of the film.

It has been suggested that melt strength, hot tack strength and heat-seal strength would be good measures on which to select films to produce pouches having improved seal integrity and therefore reduce the number of leakers. On these bases, however, it appears that one skilled in the art would not have any reason to believe that other polyolefins or blends of polyolefins perform any better than the aforementioned blend of linear ethylene-butene copolymer and high pressure polyethylene. Surprisingly, however, it has now been found that pouches made from certain films of linear copolymers of ethylene and a $C_4$–$C_{10}$ α-olefin, admixed with ethylene-vinyl acetate copolymers (EVA resins) give substantially better performance with respect to the problem of leakers. Indeed, because of this improved performance it is possible to make pouches of film with thinner film than was heretofore possible with the aforementioned film of the blend of ethylene-butene copolymer and high pressure polyethylene.

Accordingly the present invention provides a pouch containing a flowable material, said pouch being made from a sealant film in tubular form and having transversely heat-sealed ends, said film being made from a blend of a linear ethylene-$C_4$-$C_{10}$ α-olefin copolymer and an ethylene-vinylacetate copolymer, said ethylene-$C_4$-$C_{10}$ α-olefin copolymer having a density of from 0.916 to 0.930 g/cm$^3$ and a melt index of from 0.3 to 2.0 dg/min, said ethylene-vinyl acetate copolymer having a weight ratio of ethylene to vinyl acetate from 2.2:1 to 24:1 and a melt index of from 0.2 to 10 dg/min, said blend having a weight ratio of linear ethylene-$C_4$-$C_{10}$ α-olefin copolymer to ethylene vinyl acetate copolymer of from 1.2:1 to 9:1.

A preferred blend has a weight ratio of linear ethylene-$C_4$-$C_{10}$ α-olefin copolymer to ethylene-vinyl acetate copolymer of 2.33:1 to 9:1.

In a further embodiment the blend of linear ethylene-$C_4$-$C_{10}$ α-olefin copolymer and ethylene vinyl acetate copolymer has admixed therewith from 13 to 18 parts of a high pressure polyethylene having a density in the range of 0.916 to 0.924 g/cm$^3$ and a melt index in the range of 2 to 10 dg/min per 100 parts of said blends of copolymer.

In another embodiment the ethylene-$C_4$-$C_{10}$ α-olefin copolymer is selected from ethylene-butene or ethylene-octene copolymers, especially ethylene-octene copolymer.

In a further embodiment the film has a thickness from 38 to 127 μm, preferably from 51 μm to 102 μm.

In another embodiment the pouch contains from about 1.25 to 2 liters of a liquid or emulsion and the film thickness is from about 51 to 127 μm.

As used herein the term "flowable material" does not include gaseous materials, but encompasses materials which are flowable under gravity or may be pumped. Such materials include liquids e.g. milk, water, fruit juice, oil; emulsions e.g. ice cream mix, soft margarine; pastes e.g. meat pastes, peanut butter; preserves e.g. jams, pie fillings marmalade; jellies; doughs; ground meat e.g. sausage meat; powders e.g. gelatin powders, detergents; granular solids e.g. nuts, sugar; and like materials. The invention is particularly useful for flowable foods e.g. milk.

In a specific embodiment the pouch contains from about 0.1 to 5 liters, particularly from 1 to 2 liters, of a flowable material. Preferably the flowable material is a liquid, especially milk, water, fruit juice, or an emulsion, e.g. ice cream mix, soft margarine.

The present invention also provides a pouch containing a flowable material, said pouch being made from a film in tubular form and having transversely heat-sealed ends, said film comprising being a laminate of a base film and a sealant film, said base film being selected from the group consisting of nylon film, polyethylene terephthalate film, polyvinylidene chloride film, polyvinylchloride film, polyacrylonitrile film, polystyrene film and saponified ethylene-vinyl acetate film and said sealant film being made from a blend of a linear ethylene-$C_4$-$C_{10}$ α-olefin copolymer and a ethylene-vinyl acetate copolymer said ethylene-$C_4$-$C_{10}$ α-olefin copolymer having a density of from 0.916 to 0.930 g/cm$^3$ and a melt index of from 0.3 to 2.0 dg/min, said ethylene-vinyl acetate copolymer having a weight ratio of ethylene to vinyl acetate of from 2.2:1 to 24:1 and a melt index of from 0.2 to 10 dg/min, said blend having a weight ratio of linear ethylene $C_4$-$C_{10}$ α-olefin copolymer to ethylene-vinyl acetate copolymer of from 1.2:1 to 9:1, said sealant film being on the inside of the pouch.

In a preferred embodiment the weight ratio of ethylene-$C_4$-$C_{10}$ α-olefin copolymer to ethylene-vinyl acetate copolymer is from 2.33:1 to 9:1.

In another embodiment the blend of ethylene-$C_4$-$C_{10}$ α-olefin copolymer and ethylene-vinyl acetate copolymer has admixed therewith from 13 to 18 parts of a high pressure polyethylene per 100 parts of said blend, said high pressure polyethylene having a melt index in the range of 2 to 10 dg/min and a density of from 0.916 to 0.924 g/cm$^3$.

In a further embodiment the base film is selected from nylon 66, nylon 6, nylon 66/6 copolymer, nylon 6/10 copolymer, nylon 6/11 copolymer and nylon 6/12 copolymer. Preferably the base film is nylon 66, nylon 6 or nylon 66/6 copolymer.

In yet another embodiment, the base film and the sealant film have a layer of polyvinyldiene chloride (PVDC) interposed therebetween.

In another embodiment the laminate comprises a base film sandwiched between two sealant films.

In a further embodiment the flowable material is an oil, especially vegetable oil or motor oil and the base film is a nylon film.

The present invention also provides, in a process for making pouches filled with a flowable material on a vertical form and fill machine, in which process each pouch is made from a flat web of film by forming a tubular film therefrom with a longitudinal seal and subsequently flattening the tubular film at a first position and transversely heat sealing said tubular film at the flattened position, filling the tubular film with a predetermined quantity of flowable material above said first position, flattening the tubular film above the predetermined quantity of flowable material at a second position and transversely heat sealing said tubular film at the second position, the improvement comprising making the pouches from a flat web of film made from 60 to 90 parts ethylene-$C_4$-$C_{10}$ α-olefin copolymer having a density from 0.916 to 0.930 g/cm$^3$ and a melt index from 0.3 to 2.0 dg/min admixed with 10 to 40 parts ethylene-vinyl acetate copolymer having a weight ratio of ethylene to vinyl acetate of from 2.2 to 24 and a melt index of from 0.2 to 10 dg/min.

In a preferred embodiment the film web used in the process is made from the blend of the linear ethylene-$C_4$-$C_{10}$ α-olefin copolymer and ethylene-vinyl acetate copolymer, blend has admixed therewith from 13 to 18 parts of a high pressure polyethylene having a density in the range of 0.916 to 0.924 g/cm$^3$ and a melt index in the range of 2 to 10 dg/min per 100 parts of said blend.

In another embodiment the ethylene-$C_4$-$C_{10}$ α-olefin is selected from ethylene-butene or ethylene-octene copolymer, especially ethylene-octene copolymer.

The linear ethylene-$C_4$-$C_{10}$ α-olefin copolymer useful in the present invention may be made from ethylene and an α-olefin by a process disclosed in Canadian Pat. No. 856 137 which issued Nov. 7, 1970 to W. E. Baker, I. C. B. Saunders and J. M. Stewart. The linear ethylene-$C_4$-$C_{10}$ α-olefin may also be made by other processes known to those skilled in the art.

The ethylene-$C_4$-$C_{10}$ α-olefin copolymer, ethylenevinyl acetate copolymer and high pressure polyethylene are often available in pellet form.

Blends of the pelleted polymers may be fed into a film extruder and extruded into film form. A preferred film manufacturing method is the so-called blown film process disclosed in Canadian Pat. No. 460 963 issued Nov. 8, 1949 to E. I. Fuller. Films may also be made using an internal or external cooling mandrel with the blown film process, as disclosed for example in Canadian Pat. No. 893 216 issued Feb. 15, 1972 to M. Bunga and C. V. Thomas. The internal cooling mandrel blown film process is preferred. The copolymers, and high pressure polyethylene if present, may be blended prior to feeding to the film extruder hopper, or may be blended at the time of extrusion just prior to melting in the extruder, or alternatively may be melt blended in the extruder.

It will be understood by those skilled in the art that additives e.g. UV stabilizers may be added to the ethylene polymers from which pouches of the present invention are made.

The film, after manufacture, is slit longitudinally into appropriate widths. The width determines the diameter of the tube formed on the vertical form and fill machine.

Preferably, film having a thickness of 51 to 127 $\mu$m in thickness, especially 63 to 76 $\mu$m in thickness, is used for the pouches of the present invention.

Pouches containing flowable materials may then be formed in the general manner described hereinbefore on a vertical form and fill machine e.g. Prepac IS-2 or IS-6 liquid packaging machine, using the ethylene-$C_4$-$C_{10}$ $\alpha$-olefin copolymer/ethylene-vinyl acetate copolymer film described herein.

When the film is a single layer or comprises a base film sandwiched between two sealant films, the pouch may have a fin seal or a lap seal. When the film comprises a base film and a sealant film, the pouch has a fin seal, and the sealant film is on the inside of the pouch.

When the pouch is made from a laminate as described hereinbefore, the transverse sealing device may more advantageously comprise two sealing elements and a severing element as described in U.K. Pat. No. 1 377 149 granted Apr. 9, 1975 to R. E. Pederson. With such a sealing device two transverse seals are made across the tubular film above and below the transverse sections described hereinbefore and the tubular film is severed between the two transverse seals.

Film laminates as described herein, having nylon, particularly nylon 66, nylon 6 or nylon 66/6 copolymer base film are particularly desirable for packaging oleagenous liquids e.g. cooking oil, motor oil. The nylon film may be cast or oriented.

As indicated hereinbefore, examination of melt strength, hot tack strength and heat seal strength data for the linear ethylene-$C_4$-$C_{10}$ $\alpha$-olefin copolymer/ethylene-vinyl acetate copolymer blends used in the present invention leads one skilled in the art to believe that there would be no improvement in the number of leakers with pouches from such blends compared to that experienced with pouches made from a blend of linear ethylene-butene copolymer and high pressure polyethylene. In order to illustrate the lack of correlation between melt strength, hot tack strength and heat seal strength with pouch performance, several samples of films, were taken and melt strength, hot tack strength and heat seal strength were measured. 2 liter pouches of water were made using such films and the number of leakers determined by means of a drop test. In the drop test the pouches were dropped end-wise 152.4 cm onto a concrete floor.

Melt strength, is the weight of extrudate which will remain suspended for a period of 3 minutes from the orifice of a standard melt index tester (ASTM Procedure D1238-79). Heat seal strength is determined using a peel strength test similar to that used in ASTM Procedure D903 on a sample of film sealed using a Sentinel* heat seal apparatus. Hot tack strength may be determined by ASTM Procedure D3706.

*denotes trade mark.

TABLE I

| Film* | Melt Strength (g/3 min) | Heat Seal Strength 12.7 mm 180° C. | Hot Tack Strength 25.4 mm 190° C. | % Seal Failures |
|---|---|---|---|---|
| A | 0.31 | 2080 | 300 | 11.6 |
| B | 0.63 | 2040 | 300 | 2.3 |
| C | 0.38 | 2300 | 300 | 1.7 |
| D | 0.29 | 1950 | 800 | 10.3 |
| E | 0.49 | 1397 | 500 | 0.4 |

Film A is 76 $\mu$m in thickness and is made from a blend of 85 parts of a linear ethylene-$\alpha$-butene copolymer having a density of 0.919 g/cm$^3$ and a melt index of 0.75 dg/min and 15 parts of a high pressure polyethylene having a density of 0.918 g/cm$^3$ and a melt index of 8.5 dg/min.

Film B is 76 $\mu$m in thickness and is made from a blend of 85 parts of the blend of Film A and 15 parts of an ethylene-vinyl acetate copolymer having a melt index of 0.35 dg/min and a vinyl acetate content of 12 wt%.

Film C is 76 $\mu$m in thickness and is made from a blend of 85 parts of the blend of Film A and 15 parts of an ethylene-vinyl acetate copolymer having a melt index of 0.7 dg/min and a vinyl acetate content of 18 wt%.

Film D is 51 $\mu$m in thickness and is made from an ethylene-$\alpha$-octene copolymer having a density of 0.918 g/cm$^3$ and a melt index of 0.84 dg/min.

Film E is 51 $\mu$m in thickness and is made from the ethylene-$\alpha$-octene copolymer of Film D and 20 wt% of the ethylene-vinyl acetate of Film B.

Pouches made from Films B, C and E are within the scope of the present invention.

From the values of melt strength, hot tack strength and heat seal strength data it would be expected that the ethylene-$\alpha$-olefin copolymer/ethylene-vinyl acetate copolymer and, optionally, high pressure polyethylene blend film would show little, if any, advantage over the ethylene-butene copolymer/high pressure polyethylene blend film.

The following examples further serve to illustrate the invention.

EXAMPLE 1

The following resins and/or resin blends were evaluated for their performance as liquid packaging films:

U. 85 parts of an ethylene-butene copolymer having a density of 0.919 g/cm$^3$ and a melt index of 0.75 dg/min blended with 15 parts of a high pressure polyethylene having a density of 0.918 g/cm$^3$ and a melt index of 8.5 dg/min;

V. 85 parts of the resin blend in U in turn blended with 15 parts of an ethylene-vinyl acetate copolymer having a melt index of 0.35 dg/min and a vinyl acetate content of 12 wt%;

W. 85 parts of the resin blend in U in turn blended with 15 parts of an ethylene-vinyl acetate copolymer having a melt index of 0.7 dg/min and a vinyl acetate content of 18 wt%.

Pouches made from blend U is not within the scope of the present invention and exemplifies the prior art.

The resins or resin blends were extruded at a melt temperature of 232° C. into films of various gauges at 409 kg/hr using a extruder equipped with a 81.3 cm diameter circular die, and an internal film cooling mandrel.

The films were processed into 2 liter pouches, substantially filled with water, using a Prepac IS-6 liquid packaging machine. The pouches were subsequently tested for seal integrity by dropping them from a height of 152.4 cm and determining the percentage seal failures.

| | % Seal Failures | | |
|---|---|---|---|
| | Film Guage: | | |
| Blend | 51 μm | 76 μm | 102 μm |
| U | 100 | 11.6 | 11.3 |
| V | 0.9 | 2.3 | 2.7 |
| W | 1.0 | 1.7 | 0.3 |

EXAMPLE 2

Resin composition U of Example I above was blended with a number of ethylene-vinyl acetate copolymers (EVA resins) outlined below and extruded into films 76 μm in thickness. The resin blends were extruded at a melt temperature of 221° C., at a rate of 38.6 kg/hr through a 22.9 cm diameter circular die. The films were processed into 1.3 liter pouches, substantially filled with water, using a Prepac IS-6 liquid packaging machine. The pouches were subsequently tested for seal integrity by dropping them from a height of 152.4 cm. and determining the percentage seal failures.

| Sample | EVA Resin Melt Index (dg/min) | Wt. % Vinyl Acetate in the EVA Resin | % Seal Failures |
|---|---|---|---|
| U | — | — | 50 |
| U + 15% EVA I | 0.3 | 12.0 | 2 |
| U + 15% EVA II | 1.2 | 7.5 | 40 |
| U + 30% EVA II | 1.2 | 7.5 | 23 |
| U + 45% EVA II | 1.2 | 7.5 | 5 |
| U + 30% EVA III | 0.8 | 9.5 | 38 |
| U + 15% EVA IV | 3.0 | 28.0 | 0 |
| U + 15% EVA V | 0.7 | 18.0 | 0 |
| U + 30% EVA VI | 7.0 | 9.0 | 7 |
| U + 45% EVA VI | 7.0 | 9.0 | 3 |
| U + 15% EVA VII | 8.0 | 18.0 | 5 |

EXAMPLE 3

The following resins and/or resin blends were evaluated for their performance as liquid packaging films:
U. 85 parts of an ethylene-butene copolymer having a density of 0.919 gm/cm³ and a melt index of 0.75 dg/min blended with 15 parts of a high pressure polyethylene having a density of 0.918 gm/cm³ and a melt index of 8.5 dg/min;
Y. 85 parts of an ethylene-octene copolymer having a density of 0.918 g/cm³ and a melt index of 0.84 dg/min blended with 15 parts of an ethylene-vinyl acetate copolymer having a melt index of 3 dg/min and containing 28 wt% vinyl acetate;
Z. 70 parts of an ethylene-octene copolymer having a density of 0.918 g/cm and a melt index of 0.84 dg/min blended with 30 parts of an ethylene-vinyl acetate copolymer having a melt index of 1.2 dg/min and containing 7.5 wt% vinyl acetate.

Pouches made from Blend U is not within the scope of the present invention and exemplifies the prior art.

The resins were extruded at a melt temperature of 221° C. at a rate of 38.6 kg/hr. through a 22.9 cm diameter circular die, and the resulting blown film was cooled by an internal cooling mandrel. The films were subsequently processed into 1.3 liter pouches containing 1.3 liters of water, using a Prepac IS-6 liquid packaging machine. The pouches were subsequently tested for seal integrity by dropping them from a height of 152.4 cm. and determining the percentage failures.

| Blend | % Seal Failures |
|---|---|
| U | 50 |
| Y | 0 |
| Z | 0 |

I claim:
1. A pouch containing a flowable material said pouch being made from a sealant film in tubular form and having transversely heat-sealed ends, said film being made from a blend of a linear ethylene-$C_4$–$C_{10}$-α-olefin copolymer and an ethylene-vinyl acetate copolymer, said ethylene-$C_4$–$C_{10}$-α-olefin copolymer having a density of from 0.916 to 0.930 g/cm and a melt index of from 0.3 to 2.0 dg/min, said ethylene-vinyl acetate copolymer having a weight ratio of ethylene to vinyl acetate from 2.2:1 to 24:1 and a melt index of from 0.2 to 10 dg/min, said blend having a weight ratio of linear ethylene-$C_4$–$C_{10}$-α-olefin copolymer to ethylene-vinyl acetate copolymer of from 1.2:1 to 9:1.

2. A pouch according to claim 1 wherein the weight ratio of linear ethylene-$C_4$–$C_{10}$-α-olefin copolymer to ethylene-vinyl acetate copolymer is from 2.3:1 to 9:1.

3. A pouch according to claim 2 wherein the blend of linear ethylene-$C_4$–$C_{10}$-α-olefin copolymer and ethylene-vinyl acetate copolymer additionally contains from 13 to 18 parts of a high pressure polyethylene having a density in the range of 0.916 to 0.924 g/cm and a melt index in the range of 2 to 10 dg/min per 100 parts of said blend of copolymers.

4. A pouch according to claim 1 wherein the ethylene-$C_4$–$C_{10}$-α-olefin copolymer is ethylene-α-butene or ethylene-α-octene copolymer.

5. A pouch according to claim 1 wherein the film has a thickness from 38 to 127 μm.

6. A pouch according to claim 5 wherein the film thickness is from 51 to 127 μm and the pouch contains from about 1.25 to 2 liters of the flowable material.

7. A pouch according to claim 2 wherein the flowable material is a liquid or an emulsion.

8. A pouch containing a flowable material said pouch being made from a film in tubular form and having transversely heat-sealed ends, said film comprising a laminate of a base film and a sealant film, said base film being selected from the group consisting of nylon film, polyethylene terephthalate film, polyvinylidene chloride film, polyvinylchloride film, polyacrylonitrile film, polystyrene film and saponified ethylene vinyl acetate film and said sealant film being made from a blend of a linear ethylene-$C_4$–$C_{10}$ α-olefin copolymer and an ethylene-vinyl acetate copolymer, said ethylene-$C_4$–$C_{10}$ α-olefin copolymer having a density of from 0.916 to 0.930 g/cm³ and a melt index of from 0.3 to 2.0 dg/min, said ethylene-vinyl acetate copolymer having a weight ratio of ethylene to vinyl acetate of from 2.2:1 to 24:1 and a melt index of from 0.2 to 10 dg/min, said blend having a weight ratio of linear ethylene-$C_4$–$C_{10}$ α-olefin copolymer to ethylene-vinyl acetate copolymer of from 1.2:1 to 9:1 said sealant film being on the inside of the pouch.

9. A pouch according to claim 8 wherein the base film is selected from the group consisting of nylon 66, nylon 6, nylon 66/6 copolymer, nylon 6/10 copolymer, nylon 6/11 copolymer and nylon 6/12 copolymer.

10. A pouch according to claim 8 wherein the laminate comprises a base film sandwiched between two sealant films.

* * * * *